(12) United States Patent
Bin Saidan et al.

(10) Patent No.: US 7,394,061 B2
(45) Date of Patent: Jul. 1, 2008

(54) OPTICAL ENCODER WITH INTEGRATED INDEX CHANNEL

(75) Inventors: Saiful Bahari Bin Saidan, Selangor (MY); Toshiya Hataguchi, Hachioji (JP); Ting Hang Ming, Bukit Mertajam (MY)

(73) Assignee: Avago Technologies ECBU Pte Ltd, Singapore (SG)

( * ) Notice: Subject to any disclaimer, the term of this patent is extended or adjusted under 35 U.S.C. 154(b) by 119 days.

(21) Appl. No.: 11/218,225

(22) Filed: Aug. 31, 2005

(65) Prior Publication Data

US 2007/0045526 A1    Mar. 1, 2007

(51) Int. Cl.
G01D 5/34 (2006.01)

(52) U.S. Cl. .................................. 250/231.13

(58) Field of Classification Search .................. 250/231.13–231.18; 341/11, 13
See application file for complete search history.

(56) References Cited

U.S. PATENT DOCUMENTS

| 4,691,101 | A  | * | 9/1987 | Leonard | 250/231.16 |
| 5,241,172 | A  | * | 8/1993 | Lugaresi | 250/231.16 |
| 2005/0006571 | A1 | | 1/2005 | Keong | |
| 2005/0078015 | A1 | | 4/2005 | Ferran et al. | |

* cited by examiner

*Primary Examiner*—Thanh X Luu

(57) ABSTRACT

An optical encoder includes an encoder pattern having (i) an A/B pattern of first areas and second areas alternating in a first direction, wherein the first areas have a different optical transmissivity or reflectivity than the second areas, and (ii) an index pattern disposed adjacent the A/B pattern in the first direction.

20 Claims, 10 Drawing Sheets

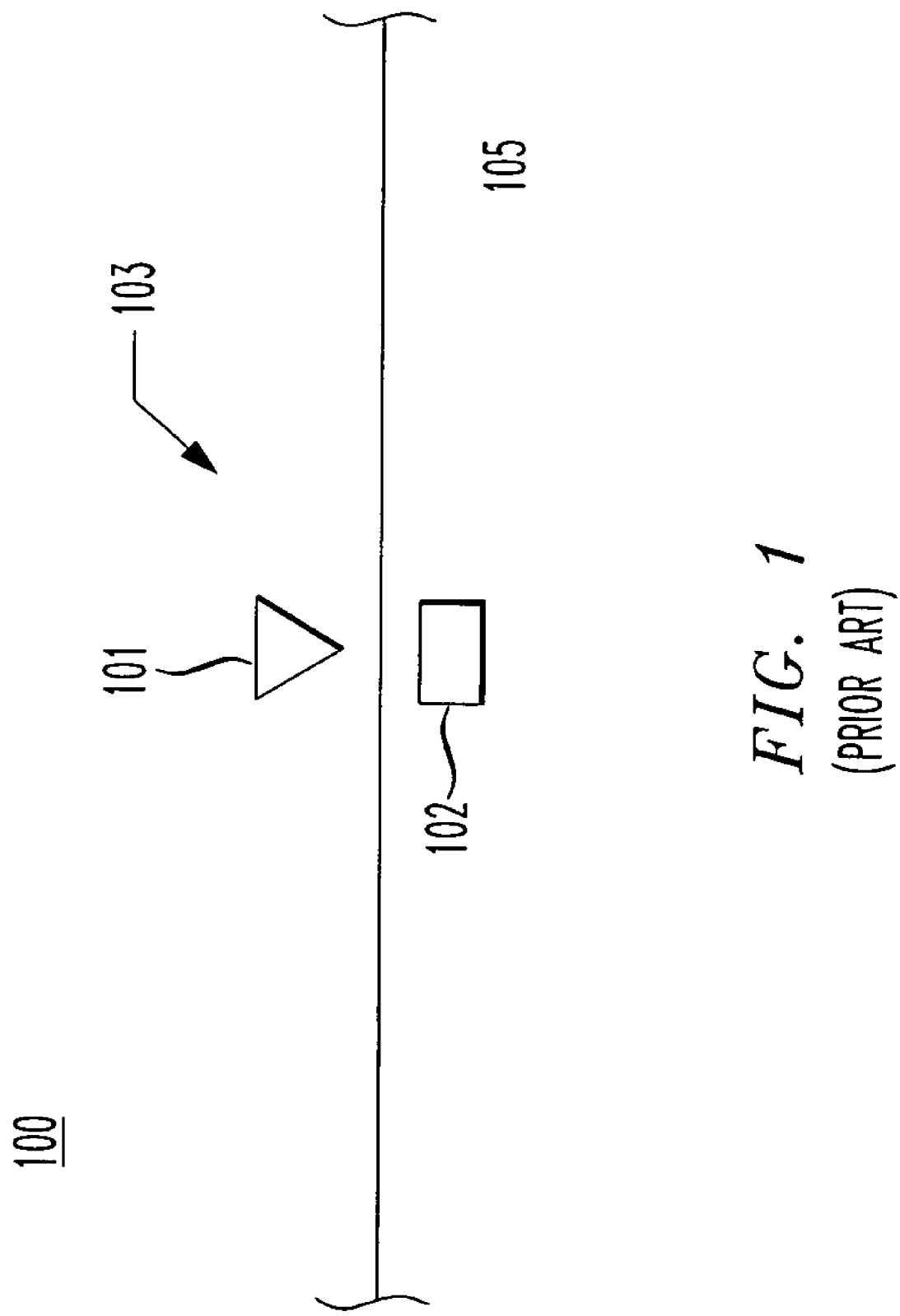

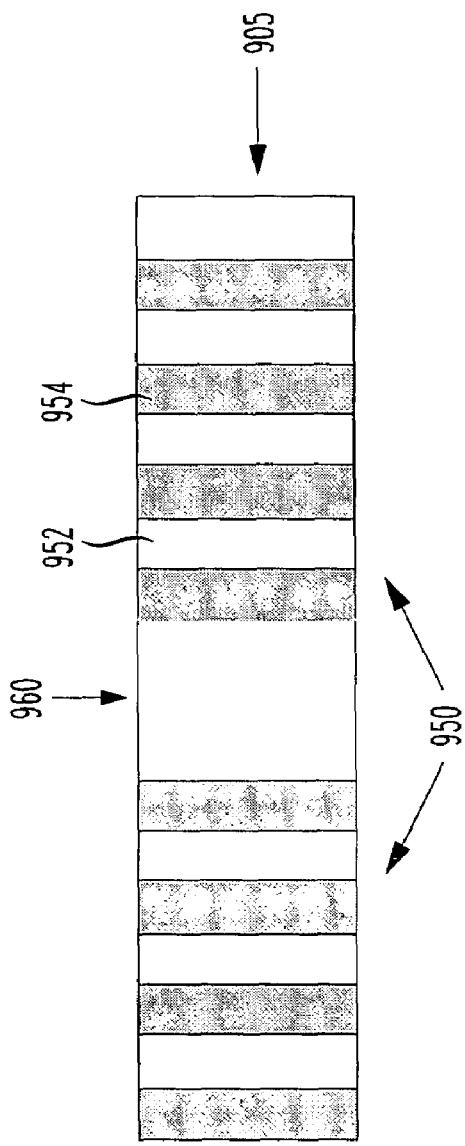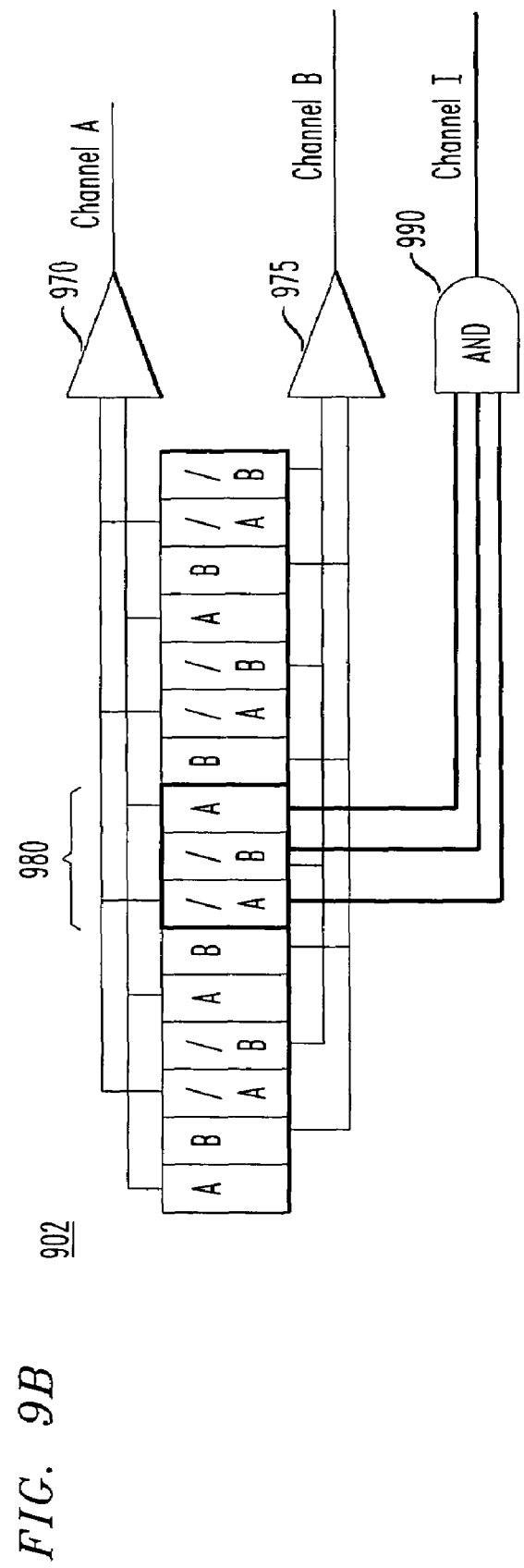
FIG. 9A
FIG. 9B

OPTICAL ENCODER WITH INTEGRATED INDEX CHANNEL

BACKGROUND

Optical encoders are used in a wide variety of contexts to determine movement and/or a position of an object with respect to some reference. Optical encoding is often used in mechanical systems as an inexpensive and reliable way to measure and track motion among moving components. For instance, printers, scanners, photocopiers, fax machines, plotters, and other imaging systems often use optical encoding to track the movement of an image media, such as paper, as an image is printed on the media or an image is scanned from the media.

One common technique for optical encoding uses an optical sensor and an encoder pattern (or encoding media). The optical sensor focuses on a surface of the encoder pattern. As the sensor moves with respect to the encoder pattern (or encoding media), or the encoder pattern moves with respect to the sensor, the sensor reads a pattern of light either transmitted through, or reflected by, the encoder pattern to detect the motion.

A typical encoder pattern is an alternating series of features. As the encoder and sensor move relative to the one another, transitions from one feature to the next in the pattern are optically detected. For instance, an encoder pattern could be an alternating pattern of holes, or optically transmissive windows, in an opaque material. In which case, an optical sensor can detect transitions from darkness to light passing through the holes or windows.

FIG. 1 illustrates a basic optical encoder 100 comprising an optical unit 103 including a light emitter 101 and an optical sensor 102, and a light controlling member (encoder pattern) 105 disposed between the light emitter 101 and the optical sensor 102. The optical unit 103 and the encoder pattern 105 can move relative to each other in a linear fashion longitudinally of the encoder pattern 105. For example, if the optical member 103 is mounted on the printing head of the inkjet printer and the encoder pattern 105 is fixed to a case of the inkjet printer, the optical unit 103 moves along the length of the encoder pattern 105 when the printing head moves.

FIGS. 2A and 2B illustrate in further detail a 3-channel optical encoder comprising an encoder pattern and an optical sensor. FIG. 2A shows a code wheel (or code strip) encoder pattern 105, comprising an alternating A/B pattern 210 and a separate index pattern 220. The A/B pattern 210 comprises a pattern having alternating areas of differing optical transmissivity or reflectivity, depending on the design of the optical encoder. All of the first ("A") portions 212 have a same length longitudinally along the encoder pattern 105. All of the second ("B") portions 214 have a same length longitudinally along the encoder pattern 105. Further, the length of a first portion 212 longitudinally along the encoder pattern 105 and the length of a second portion 214 longitudinally along the encoder pattern 105 are equal to each other. In other words, a length L as a sum of the length of a first portion 212 longitudinally along the encoder pattern 105 and the length of a second portion 214 longitudinally along the encoder pattern 105 is constant in any adjacent pair of first and second portions 212, 214.

Meanwhile, FIG. 2B shows a optical sensor 102, comprising an A/B channel detector array 250, first and second ("A" and "B") channel processing blocks 270 and 275, index channel detector 280, and index channel processing block 290. Although not shown in FIGS. 2A-B, the optical encoder also includes a light emitter such as light emitter 101 of FIG. 1. The light emitter may comprise one or more light emitting diodes for illuminating the encoder pattern 105.

The optical sensor 102 includes, as shown in FIG. 2B, a photodiode group 260 including four photodiodes 261-264. These four photodiodes 261-264 are arranged close to each other in the direction of the relative movement between the optical unit 103 and the encoder pattern 105. All of the photodiodes 261-264 have a same length in the direction of the arrangement, and a total of the four lengths is K. In other words, a length of the photodiode group 260 in the direction of the relative movement between the optical unit 103 and the encoder pattern 105 is K. In the above arrangement, K and L are each other, for example equal to each other within a manufacturing tolerance or error. It should be noted here that there may be a slight gap between each pair of adjacent photodiodes 261-264 due to technical reasons of manufacture, but these gaps are not illustrated in FIG. 2B. The photodiodes 261-264 have output terminals connected with input terminals of first and second channel processing blocks 270 and 275.

FIG. 3 more clearly illustrates a positional relationship between the encoder pattern 105 and the A/B channel detector array 250 including a plurality of photodiode groups 260.

If the encoder pattern 105 moves longitudinally with respect to the optical unit 103 (or vice versa), the first and second channel processing blocks 270 and 275 output the first and second channel signals "A" and "B" respectively, as shown in FIG. 4.

As can be seen in FIG. 4, the first and second channel signals indicate a relative movement between the optical unit 103 and the encoder pattern 105. However, they do not indicate a positional relationship of the optical unit 103 and the encoder pattern 105 with respect to each other. In many cases it is necessary to detect a relative positional relationship between the optical unit 103 and the encoder pattern 105 to determine an index or homing position of the optical sensor 102, or for end-point detection of the allowable movement range of the optical unit 103.

Accordingly, as shown in FIGS. 2A-B, the 3-channel optical encoder includes an index channel in addition to the first and second ("A" and "B") channels. That is, the encoder pattern 105 includes the separate index pattern 220, and the optical sensor 102 includes the index pattern detector 280. The index pattern detector 280 outputs the index channel signal shown in FIG. 4.

However, there are some disadvantages to the 3 channel optical sensor as described above. For example, as optical encoders are increasingly integrated into smaller devices such as cameras, mobile telephones, etc., it becomes increasingly important to minimize the size of the optical encoder. However, the need for a separate index channel detector for the index channel increases the size of the integrated circuit for the optical unit. Similarly, the separate index pattern increases the size of the encoder pattern and the media (e.g., codestrip or codewheel) on which it is incorporated.

What is needed, therefore is an optical encoder that overcomes at least the shortcomings of known optical encoders described above.

SUMMARY

In an example embodiment, an optical encoder comprises: an encoder pattern, including an A/B pattern comprising a series of first areas and second areas alternating along a line extending in a longitudinal direction, wherein the first areas have a different optical transmissivity or reflectivity than the second areas, and an index pattern disposed along the line extending in the longitudinal direction; and an optical sensor including a detector array outputting first and second channel signals indicating relative movement between the optical sensor and the encoder pattern, and outputting an index channel signal indicating an index position of the optical sensor with respect to the encoder pattern, wherein the index channel signal is obtained by logically combining outputs of a set of at least three adjacent detectors in the detector array.

In another example embodiment, an optical encoder, comprises: a codewheel having: an A/B pattern, comprising a series of first areas and second areas alternating in a circular direction on the codewheel, wherein the first areas have a different optical transmissivity or reflectivity than the second areas, and an index pattern disposed on the codewheel adjacent in the circular direction to the A/B encoder pattern; and an optical sensor including a detector array outputting first and second channel signals indicating relative movement between the optical sensor and the codewheel, and outputting an index channel signal indicating an index position of the optical sensor with respect to the codewheel, wherein the index channel signal is obtained by logically combining outputs of a set of at least three adjacent detectors in the detector array.

In yet another example embodiment, an optical encoder comprises: an encoder pattern, including: an A/B pattern comprising a series of first areas and second areas alternating in a first direction, wherein the first areas have a different optical transmissivity or reflectivity than the second areas, and an index pattern disposed adjacent the A/B pattern in the first direction; and an optical sensor including a detector array outputting first and second channel signals indicating relative movement between the optical sensor and the encoder pattern, and outputting an index channel signal indicating an index position of the optical sensor with respect to the encoder pattern, wherein the index channel signal is obtained by logically combining outputs of a set of at least three adjacent detectors in the detector array.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 1 shows a basic optical encoder;

FIG. 9A shows another embodiment of an encoder pattern of a code strip or code wheel of an optical encoder;

FIG. 9B shows another embodiment of an optical sensor of an optical encoder;

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Figure 2A:
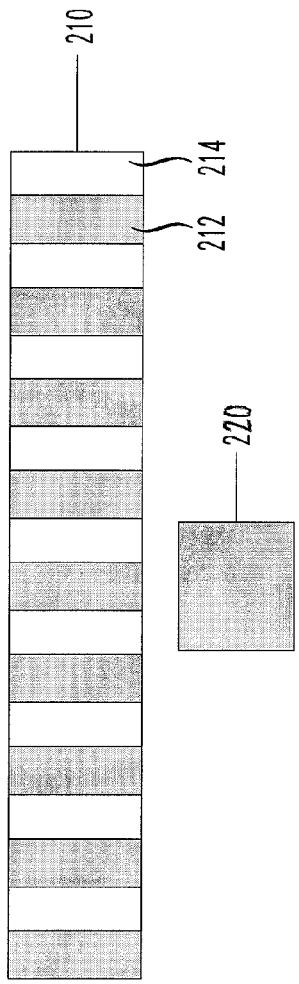
FIG. 2A shows an encoder pattern of a code strip or code wheel of a 3-channel optical encoder.
Figure 2B:
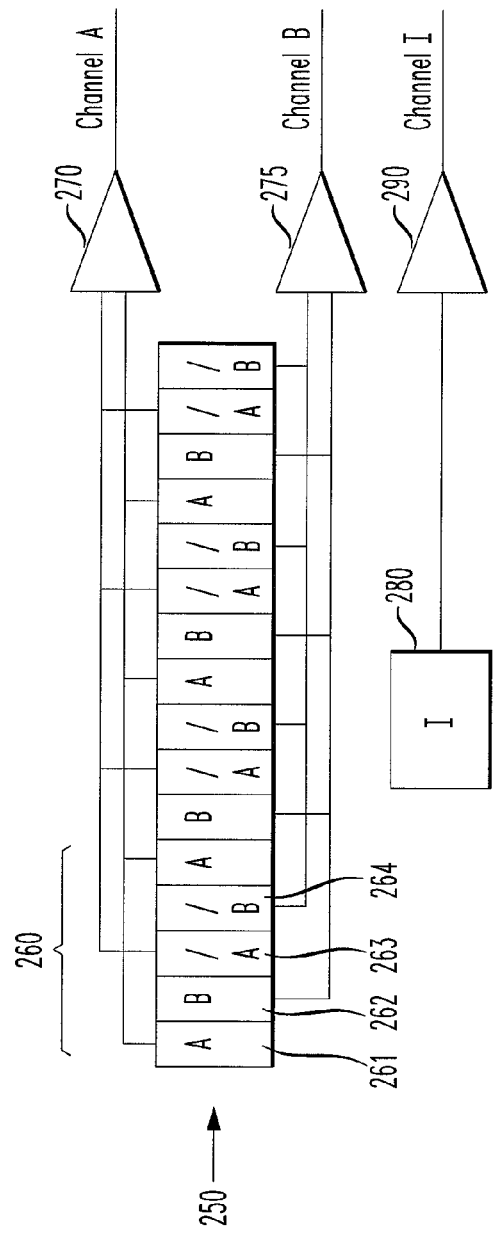
FIG. 2B shows an optical sensor of a code strip or code wheel of a 3-channel optical encoder.
Figure 3:
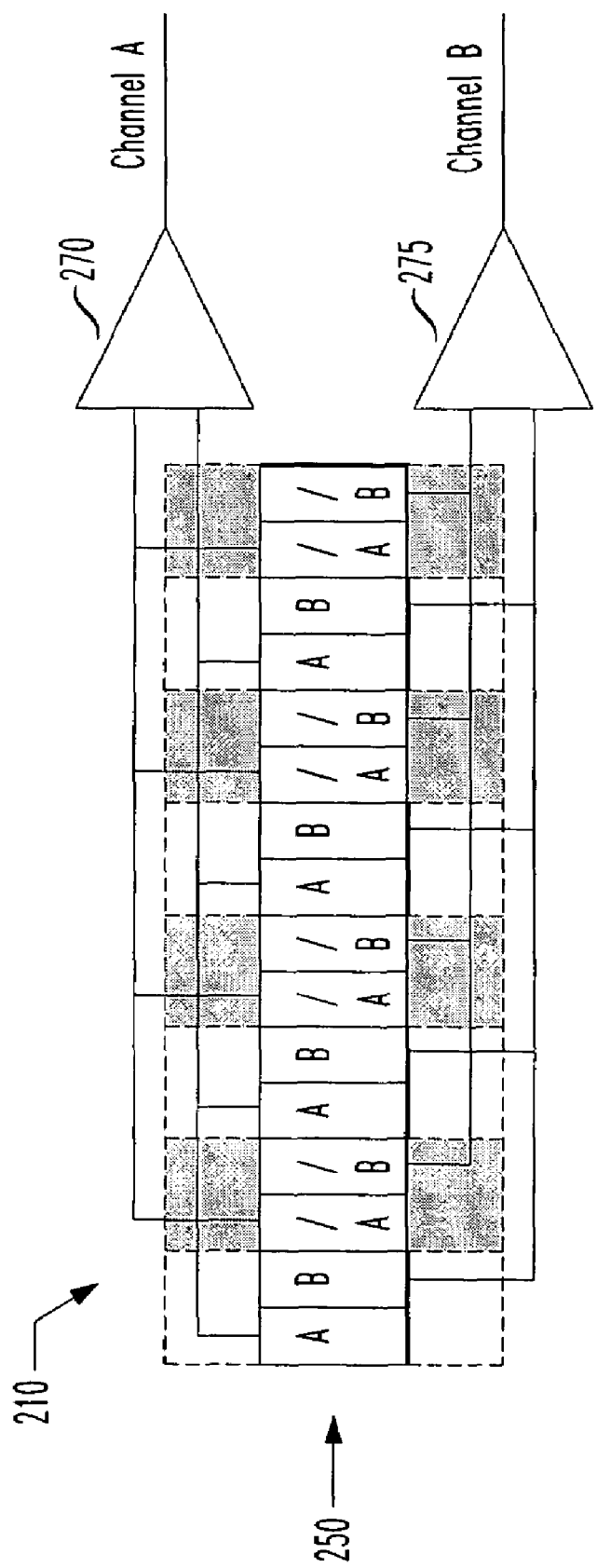
FIG. 3 illustrates a positional relationship between the encoder pattern and the A/B channel detector array of FIGS. 2A-B.
Figure 4:
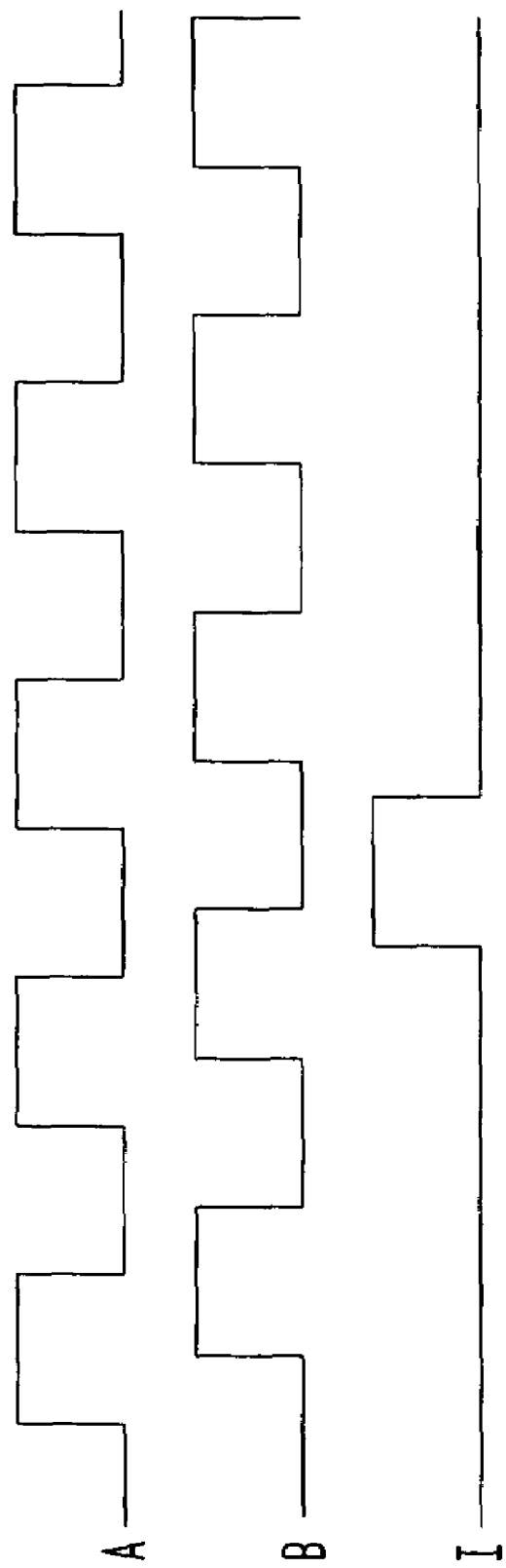
FIG. 4 shows the output signals of the 3-channel optical sensor of FIG. 2B.
Figure 5:
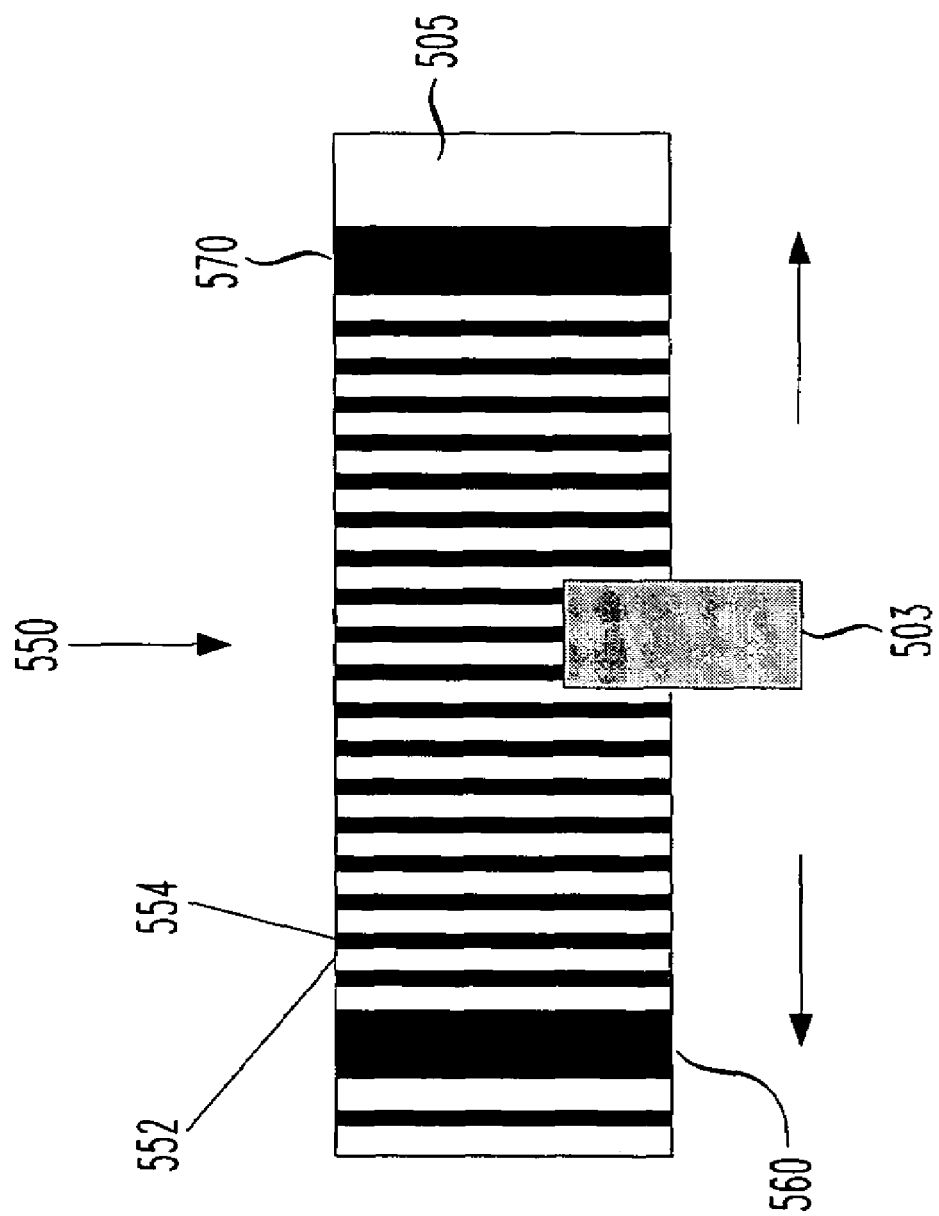
FIG. 5 shows one embodiment of an optical encoder.

FIG. 5 shows an example embodiment of an optical encoder 500 which detects an index channel without a separate, index detector. The optical encoder 500 includes an optical unit 503 including a light emitter and an optical sensor, and a light controlling member comprising a codestrip having a linear encoder pattern 505. The linear encoder pattern 505 includes: (i) an A/B pattern 550 comprising a series of first areas 552 and second areas 554 alternating along a line extending in a longitudinal direction, wherein the first areas have a different optical transmissivity or reflectivity than the second areas; and (ii) two index patterns 560, 570 disposed along the line extending in the longitudinal direction of the A/B pattern 550, the index patterns 560, 570 being arranged at corresponding opposite ends of the A/B pattern 550.

The optical unit 503 and the encoder pattern 505 can move relative to each other longitudinally of the encoder pattern 505. For example, if the optical member 503 is mounted on the printing head of the inkjet printer and the encoder pattern 505 is fixed to a case of the inkjet printer, the optical unit 503 moves along the length of the encoder pattern 505.

Figure 6A:
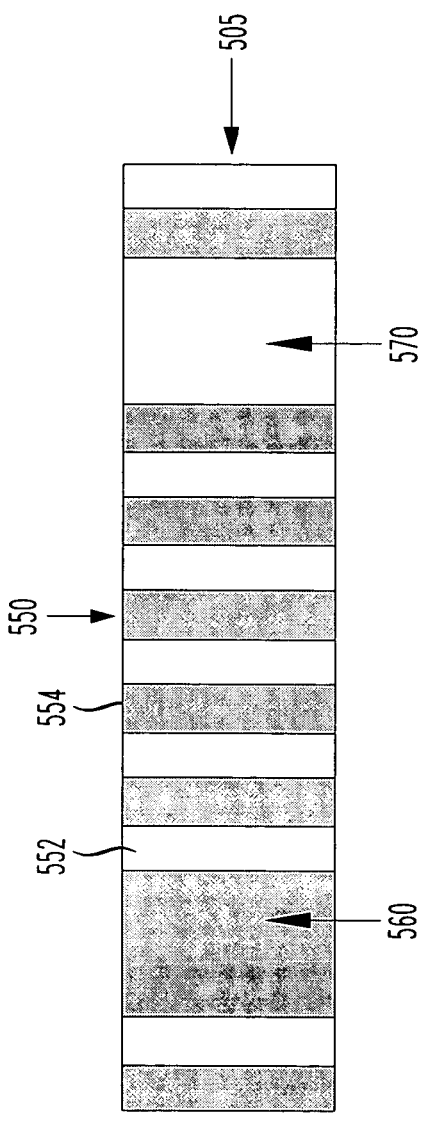
FIG. 6A shows an encoder pattern of a code strip of the optical encoder of FIG. 5.

FIG. 6A shows a more detailed view of the code strip encoder pattern 505, comprising the A/B pattern 550 and index patterns 570. The A/B pattern 550 comprises a pattern having alternating areas of differing optical transmissivity or reflectivity, depending on the design of the optical encoder. All of the first ("A") portions 552 have a same length longitudinally along the encoder pattern 505. All of the second ("B") portions 554 have a same length longitudinally along the encoder pattern 505. Further, the length of a first portion 552 longitudinally along the encoder pattern 505 and the length of a second portion 554 longitudinally along the encoder pattern 505 are equal to each other. In other words, a length L as a sum of the length of a first portion 552 longitudinally of the encoder pattern 505 and the length of a second portion 554 longitudinally of the encoder pattern 505 is constant in any pair of first and second portions 552 and 554.

As shown in FIG. 6A, the encoder pattern 505 includes two index patterns 560, 570. In this embodiment, the index pattern 560 is a left limit index pattern, and the index pattern 570 is a right limit index pattern, which indicate, respectively, left and right end-points of the positional movement of the optical unit 503. That is, the index patterns 560, 570 may be used to obtain absolute positional information of the optical unit 503 with respect to the encoder pattern 505.

Figure 6B:
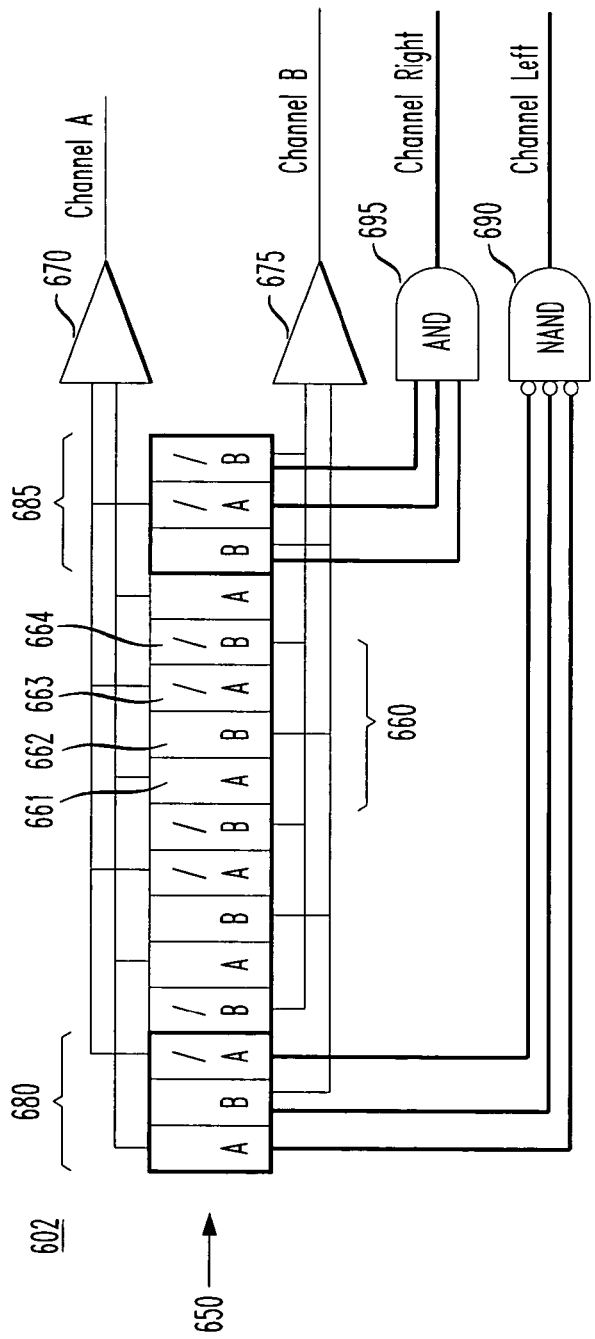
FIG. 6B shows one embodiment of an optical sensor of the optical encoder of FIG. 5.

Meanwhile, FIG. 6B shows an example embodiment of an optical sensor 602 that may be included in the optical sensor 503 of FIG. 5. Optical sensor 602 includes a detector array 650, first and second ("A" and "B") channel processing blocks 670 and 675, and first and second index channel processing blocks 690, 695. Although not shown in FIGS. 6A-B, the optical encoder 500 also includes a light emitter such as light emitter 101 of FIG. 1. The light emitter may comprise one or more light emitting diodes for illuminating the encoder pattern 505.

The optical sensor 602 includes, as shown in FIG. 6B, a photodiode group 660 including four photodiodes 661-664. However, any convenient optical detector may be used in place of the photodiodes. These four photodiodes 661-664 are arranged close to each other in the direction of the relative movement between the optical unit 503 and the encoder pattern 505. All of the photodiodes 661-664 have a same length in the direction of the arrangement, and a total of the four lengths is K. In other words, the length of the photodiode group 660 in the direction of the relative movement between the optical unit 503 and the encoder pattern 505 is K. In the above arrangement, K and L are equal to each other, for example equal to each other within a manufacturing tolerance or error. It should be noted here that there may be a slight gap between each pair of adjacent photodiodes 661-664 due to technical reasons of manufacture, but these gaps are not illustrated in FIG. 6B. The photodiodes 661-664 have output terminals connected with input terminals of first and second channel processing blocks 670 and 675.

Figure 7:
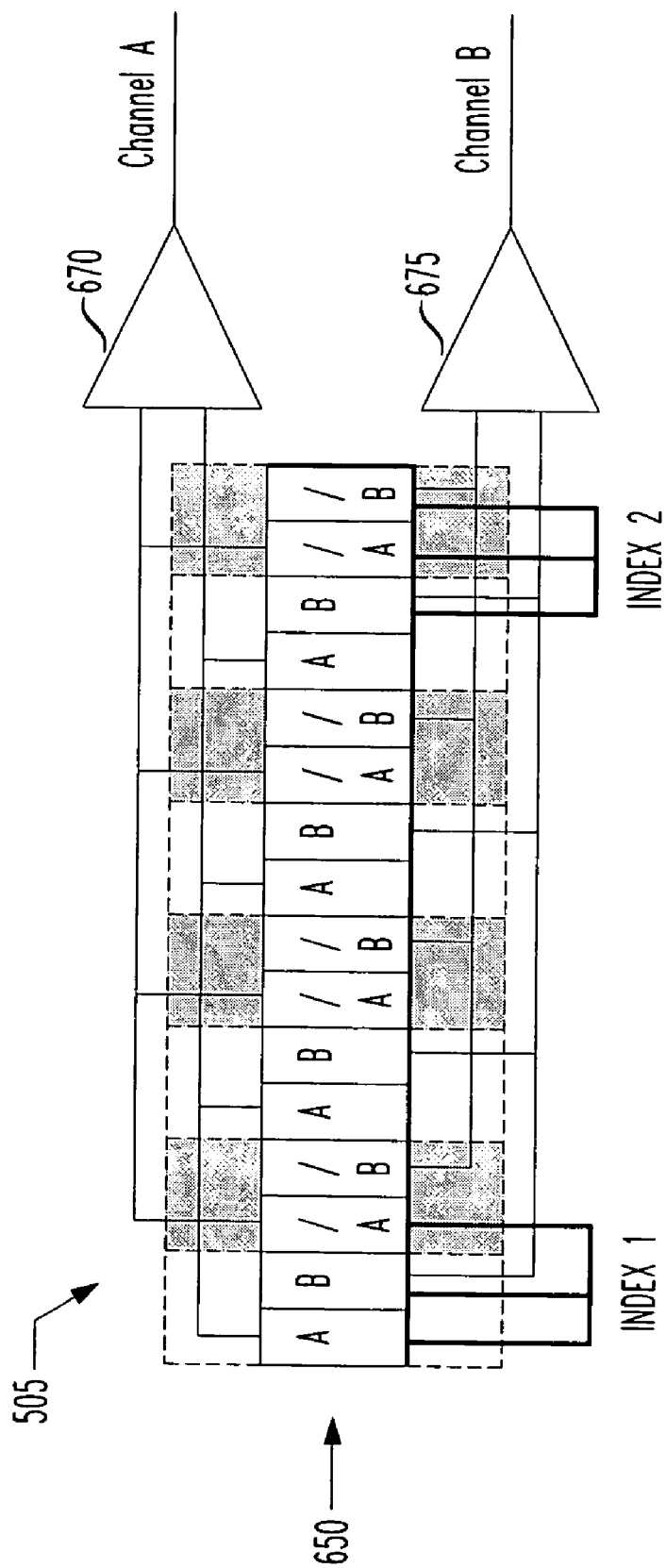
FIG. 7 illustrates a positional relationship between the encoder pattern and the A/B channel detector array of FIGS. 6A-B.

FIG. 7 illustrates a positional relationship between the encoder pattern 505 and the A/B channel detector array 650.

Figure 8:
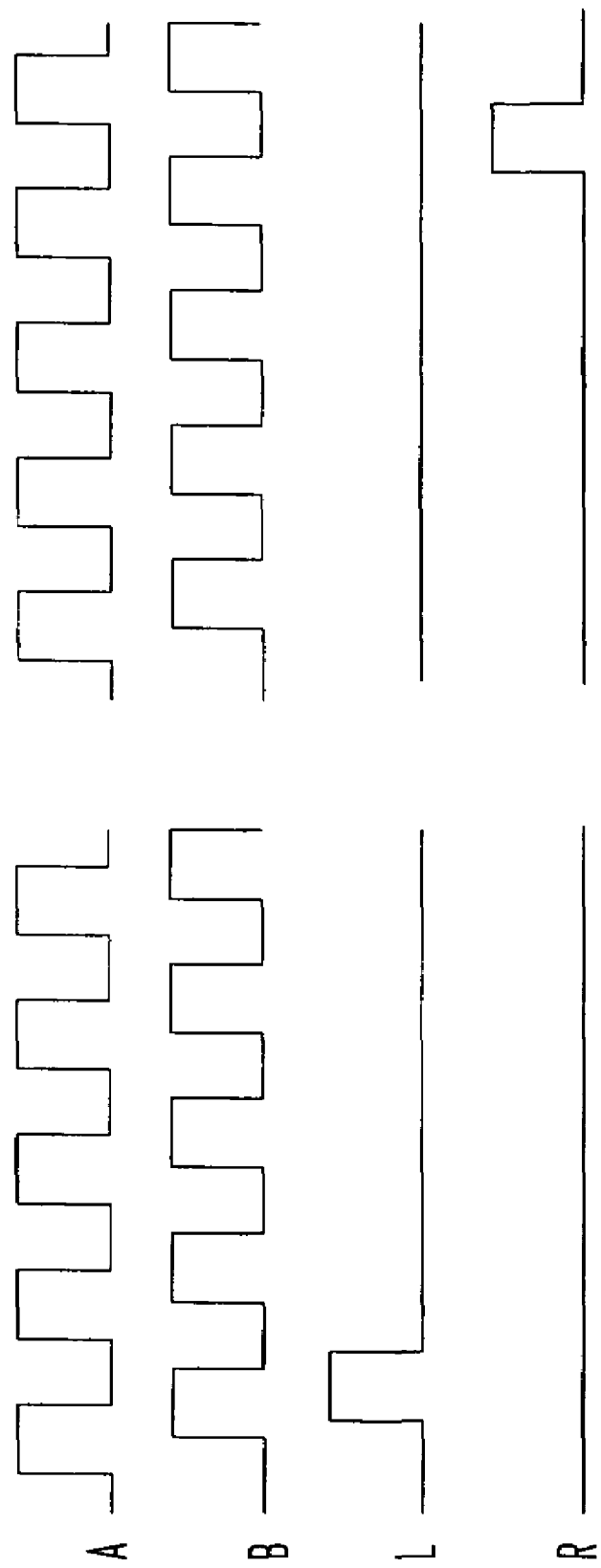
FIG. 8 shows the output signals of the optical sensor of FIG. 6B.

If the encoder pattern 505 moves longitudinally with respect to the optical unit 503 (or vice versa), the first and second channel processing blocks 670 and 675 output the first and second channel signals "A" and "B" respectively, as shown in FIG. 8. As can be seen in FIG. 8, the first and second channel signals indicate a relative movement between the optical unit 503 and the encoder pattern 505.

As noted above, the optical sensor 602 includes the first set 680 of at least three adjacent detectors in the detector array 650, and the second set 685 of at least three adjacent detectors in the detector array 650. The output signals of the detectors of the first set 680 of at least three adjacent detectors in the detector array 650 are connected with input terminals of first index channel processing block 690. Similarly, the output signals of the detectors of the second set 685 of at least three adjacent detectors in the detector array 650 are connected with input terminals of second index channel processing block 695.

The first index channel processing block 690 logically combines the outputs of the detectors of the first set 680 of detectors to obtain a first index channel signal as shown in FIG. 8. In the embodiment shown in FIG. 6B first index channel processing block 690 comprises a NAND gate for logically NAND-ing the outputs of the detectors of the first set 680 of detectors to obtain the first index channel signal. Similarly, second index channel processing block 695 logically combines the outputs of the detectors of the second set 685 of detectors to obtain a second index channel signal as shown in FIG. 8. In the embodiment shown in FIG. 6B second index channel processing block 695 comprises an AND gate for logically AND-ing the outputs of the detectors of the second set 685 of detectors to obtain the second index channel signal. It should be understood that other logical combinations of the outputs of first and second sets of detectors 680 and 685 are possible, depending upon the first and second index patterns 570, 560. For example, in some embodiments, the first index channel processing block 690 may comprise an AND gate instead of a NAND gate, and similarly the second index channel processing block 695 may comprise a NAND gate instead of an AND gate.

As can be seen in FIG. 8, the first and second index channel signals indicate left and right end-points, respectively, of the positional movement of the optical unit 503. More generally, the first and second index channel signals indicate absolute positional information of the optical unit 503 with respect to the encoder pattern 505. Of course in appropriate applications where it is only necessary or desirable to establish one end-point, only one index channel pattern and index channel processing block may be used.

The output signals of the detectors of the first and second sets 680, 685 are also connected with input terminals of first and second channel processing blocks 670 and 675 and thereby used to obtains the first and second channel signals "A" and "B" indicating a relative movement between the optical unit 503 and the encoder pattern 505.

The encoder 500 as described above can provide index channel signal(s) without using any separate, dedicated index channel detectors, or any remote index pattern. This can reduce the size of an integrated circuit for the optical encoder and/or the codestrip or codewheel that includes the encoder pattern. In turn, this allows for a smaller and possibly less expensive optical encoder.

FIG. 9A shows another example embodiment of an encoder pattern 905 of a code strip or code wheel of an optical encoder. In contrast to the encoder pattern 505 of FIGS. 5 and 6A, the encoder pattern 905 includes a single index pattern 960 in the "middle" of the A/B pattern 950 comprising a series of first areas 952 and second areas 954.

Although for ease of illustration, the encoder pattern 905 is shown in FIG. 9 as being linear and extending in a longitudinal direction, it should be understood that the encoder pattern 905 may be incorporated with a codewheel. In that case, the encoder pattern 905 may extend in a circular direction along a surface of the codewheel. That is, in that case the encoder pattern 905 includes: (i) the A/B pattern 950, comprising a series of first areas 952 and second areas 954 alternating in a circular direction on the codewheel, wherein the first areas 952 have a different optical transmissivity or reflectivity than the second areas 954; and (ii) an index pattern 960 disposed on the codewheel adjacent in the circular direction to the A/B encoder pattern 950. As used herein, extending in a "circular direction" means extending along a path that upon its completion traces a circle.

Figure 10:
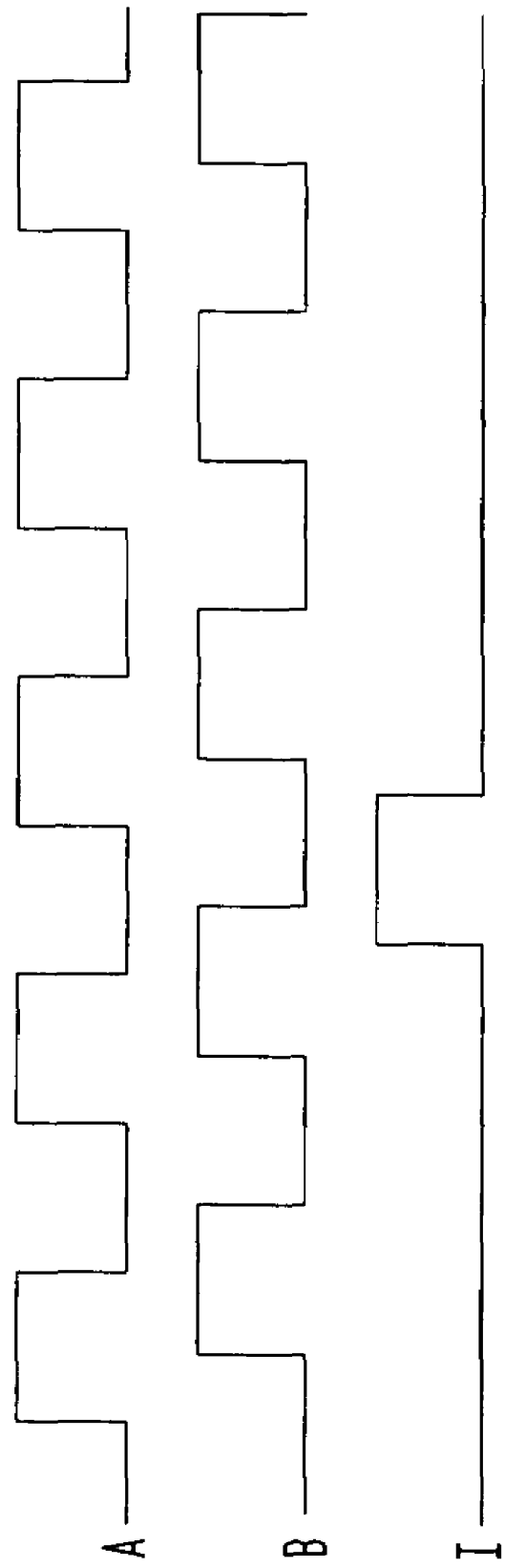
FIG. 10 shows the output signals of the optical sensor of FIG. 9B.

FIG. 9B shows another example embodiment of an optical sensor 902 of an optical encoder that may be used with the encoder pattern 905. In contrast to the optical sensor 602, the optical sensor 902 includes a single set 980 of at least three adjacent detectors in the detector array. The output signals of the detectors of the set 980 of at least three adjacent detectors in the detector array are connected with input terminals of index channel processing block 990. Index channel processing block 990 logically combines the outputs of the detectors of the set 980 of detectors to obtain an index channel signal as shown in FIG. 10. In the embodiment shown in FIG. 9B index channel processing block 990 comprises an AND gate for logically AND-ing the outputs of the detectors of the set 980 of detectors to obtain the index channel signal. It should be understood that other logical combinations of the outputs of the detectors of the set of detectors 980 are possible, depending upon the index pattern 990. For example, in some embodiments, the index channel processing block 990 may comprise a NAND gate instead of an AND gate As can be seen in FIG. 10, the index channel signal indicates a homing position of the optical unit. More generally, the index channel signal indicates absolute positional information of the optical unit with respect to the encoder pattern 905.

The output signals of the detectors of the set 980 of at least three adjacent detectors in the detector array are also connected with input terminals of first and second channel processing blocks 970 and 975 and thereby used to obtain the first and second channel signals "A" and "B" of FIG. 10 indicating a relative movement between the optical unit and the encoder pattern 905.

While example embodiments are disclosed herein, one of ordinary skill in the art appreciates that many variations that are in accordance with the present teachings are possible and remain within the scope of the appended claims. The embodiments therefore are not to be restricted except within the scope of the appended claims.

The invention claimed is:

1. An optical encoder, comprising:
an encoder pattern, including:
an A/B pattern comprising a series of first areas and second areas alternating along a line extending in a longitudinal direction, wherein the first areas have a different optical transmissivity or reflectivity than the second areas, and
an index pattern disposed along the line extending in the longitudinal direction; and
an optical sensor including a detector array outputting first and second channel signals indicating relative movement between the optical sensor and the encoder pattern, and outputting an index channel signal indicating an index position of the optical sensor with respect to the encoder pattern,
wherein the index channel signal is obtained by logically combining outputs of a set of at least three adjacent detectors in the detector array.

2. The optical encoder of claim 1, wherein the index channel signal is obtained by logically AND-ing or logically NAND-ing the outputs of the set of at least three adjacent detectors in the detector array.

3. The optical encoder of claim 1, wherein two of the outputs of the set of at least three adjacent detectors in the detector array are used to obtain the first channel signal, and wherein another one of the outputs of the set of at least three adjacent detectors in the detector array is also used to obtain the second channel signal.

4. The optical encoder of claim 1, further comprising a second index pattern disposed along the line extending in the longitudinal direction, wherein the detector array outputs a second index channel signal indicating a second index position of the optical sensor with respect to the encoder pattern, wherein the second index channel signal is obtained by logically combining outputs of a second set of at least three adjacent detectors in the detector array.

5. The optical encoder of claim 4, where the first and second index positions indicate end-points of movement of the optical sensor.

6. The optical encoder of claim 4, wherein the first set of at least three adjacent detectors are a first three detectors at a first end of the detector array, and wherein the second set of at least three adjacent detectors are a last three detectors at a second end of the detector array.

7. The optical encoder of claim 1, further comprising one of an AND gate and a NAND gate adapted to receive the outputs of the set of at least three adjacent detectors in the detector array and to output the index channel signal.

8. An optical encoder, comprising:
a codewheel having:
an A/B pattern, comprising a series of first areas and second areas alternating in a circular direction on the codewheel, wherein the first areas have a different optical transmissivity or reflectivity than the second areas, and
an index pattern disposed on the codewheel adjacent in the circular direction to the A/B encoder pattern; and
an optical sensor including a detector array outputting first and second channel signals indicating relative movement between the optical sensor and the codewheel, and outputting an index channel signal indicating an index position of the optical sensor with respect to the codewheel,
wherein the index channel signal is obtained by logically combining outputs of a set of at least three adjacent detectors in the detector array.

9. The optical encoder of claim 8, wherein the index channel signal is obtained by logically AND-ing or logically NAND-ing the outputs of the set of at least three adjacent detectors in the detector array.

10. The optical encoder of claim 8, wherein two of the outputs of the set of at least three adjacent detectors in the detector array are used to obtain the first channel signal, wherein an other one of the outputs of the set of at least three adjacent detectors in the detector array is also used to obtain the second channel signal.

11. The optical encoder of claim 8, further comprising one of an AND gate and a NAND gate adapted to receive the outputs of the set of at least three adjacent detectors in the detector array and to output the index channel signal.

12. An optical encoder, comprising:
an encoder pattern, including:
an A/B pattern comprising a series of first areas and second areas alternating in a first direction, wherein the first areas have a different optical transmissivity or reflectivity than the second areas, and
an index pattern disposed adjacent the A/B pattern in the first direction; and
an optical sensor including a detector array outputting first and second channel signals indicating relative movement between the optical sensor and the encoder pattern, and outputting an index channel signal indicating an index position of the optical sensor with respect to the encoder pattern,
wherein the index channel signal is obtained by logically combining outputs of a set of at least three adjacent detectors in the detector array.

13. The optical encoder of claim 12, wherein the index signal is obtained by logically AND-ing or logically NAND-ing the outputs of the set of at least three adjacent detectors in the detector array.

14. The optical encoder of claim 12, wherein two of the outputs of the set of at least three adjacent detectors in the detector array are used to obtain the first channel signal, and wherein another one of the outputs of the set of at least three adjacent detectors in the detector array is also used to obtain the second channel signal.

15. The optical encoder of claim 12, further comprising a second index pattern disposed adjacent the A/B pattern in the first direction, wherein the detector array outputs a second index channel signal indicating a second index position of the optical sensor with respect to the encoder pattern, wherein the second index channel signal is obtained by logically combining outputs of a second set of at least three adjacent detectors in the detector array.

16. The optical encoder of claim 15, where the first and second index positions indicate end-points of movement of the optical sensor.

17. The optical encoder of claim 15, wherein the first set of at least three adjacent detectors are a first three detectors at a first end of the detector array, and wherein the second set of at least three adjacent detectors are a last three detectors at a second end of the detector array.

18. The optical encoder of claim 12, further comprising one of an AND gate and a NAND gate adapted to receive the outputs of the set of at least three adjacent detectors in the detector array and to output the index channel signal.

19. The optical encoder of claim 12, wherein the first and second channel signals are periodic signals having a same period, wherein a phase of the first channel signal is advanced one quarter of a period with respect to the second channel signal.

20. The optical encoder of claim 12, wherein lengths of the first areas in the first direction, lengths of the second areas in the first direction, and lengths of each of the at least three adjacent detectors in the first direction, are all the same.

* * * * *